United States Patent [19]

Almond et al.

[11] Patent Number: 4,496,372
[45] Date of Patent: Jan. 29, 1985

[54] ABRASIVE BODIES

[76] Inventors: Eric A. Almond, 34 Weston Ave., West Molesey, Surrey, England, KT8 9RG; Mark G. Gee, 20, Morland Close, Hampton, Teddington, Middlesex, England

[21] Appl. No.: 480,485

[22] Filed: Mar. 30, 1983

[30] Foreign Application Priority Data

Mar. 31, 1982 [GB] United Kingdom ............... 8209410
Jan. 31, 1983 [GB] United Kingdom ............... 8302620

[51] Int. Cl.³ ............................................. B24D 3/02
[52] U.S. Cl. .................................. 51/309; 51/293
[58] Field of Search ............................ 51/293, 309

[56] References Cited

U.S. PATENT DOCUMENTS 3,141,746 7/1964 De Lai ................................ 51/309
3,745,623 7/1973 Wentorf, Jr. ........................ 29/95
4,156,329 5/1979 Daniels et al. ..................... 51/309
4,225,322 9/1980 Knemeyer .......................... 51/309

FOREIGN PATENT DOCUMENTS 1489130 10/1977 United Kingdom .

OTHER PUBLICATIONS

Newsom, M. and Huff, C. F., "Sandia Laboratories Drilling Technology Research Program, Albuquerque, New Mexico, pp. H-8/1-H 8/19.

Primary Examiner—Paul Lieberman
Assistant Examiner—Willie J. Thompson
Attorney, Agent, or Firm—Handal & Morofsky

[57] ABSTRACT

There is provided a method of bonding an abrasive compact to a metal-containing support body, typically a body of cemented carbide, using solid state diffusion bonding techniques. The metal which is used for the diffusion bonding is nickel, copper, cobalt, iron or an alloy containing one or more of these metals.

17 Claims, 2 Drawing Figures

U.S. Patent  Jan. 29, 1985  4,496,372
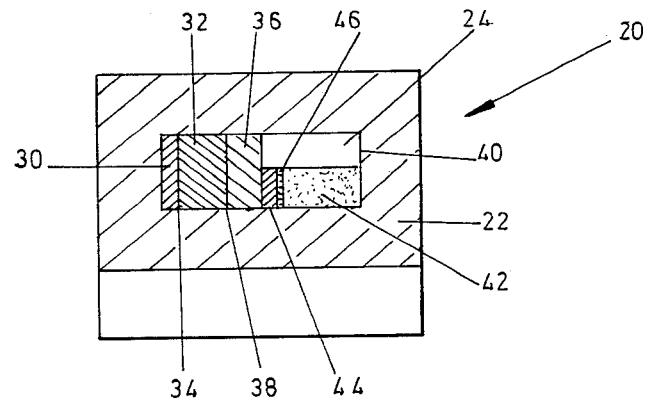
FIG_1
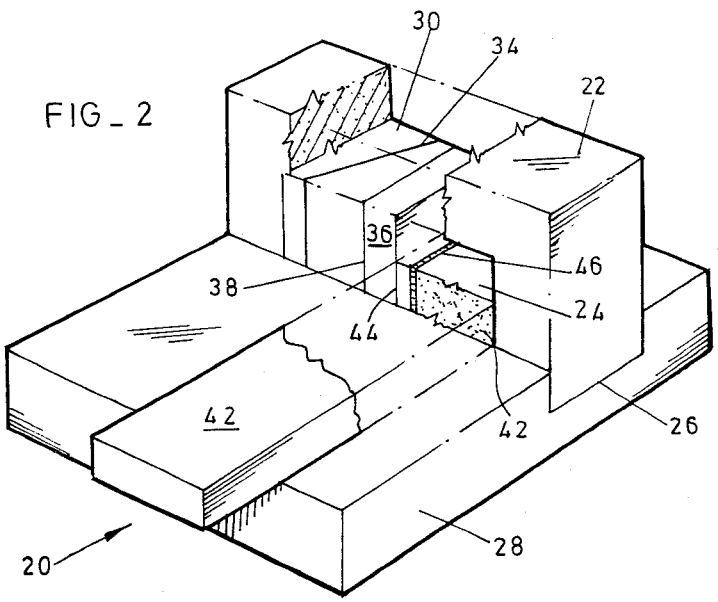
FIG_2

ABRASIVE BODIES

BACKGROUND OF THE INVENTION

This invention relates to abrasive bodies.

Abrasive compacts are well known in the art and are used extensively in industry for the abrading of various workpieces. They consist essentially of a mass of abrasive particles present in an amount of at least 70 percent, preferably 80 to 90 percent, by volume of the compact bonded into a hard conglomerate. Compacts are polycrystalline masses having some direct diamond-to-diamond bonding. The abrasive particles of compacts are invariably super-hard abrasives such as diamond and cubic boron nitride.

Abrasive compacts may contain a second phase or bonding matrix which contains a catalyst (also known as a solvent) useful in synthesising the particles. In the case of cubic boron nitride examples of suitable catalysts are aluminium or an alloy of aluminium with nickel, cobalt, iron, manganese or chromium. In the case of diamond, examples of suitable catalysts are metals of Group VIII of the Periodic Table such as cobalt, nickel or iron or an alloy containing such a metal.

Abrasive compacts may be provided in the form of circular discs or segments thereof or fragments of other shapes.

Diamond and cubic boron nitride compacts are manufactured under conditions of temperature and pressure at which the abrasive particle is crystallographically stable.

Abrasive compacts may be bonded directly to a tool or shank for use. Alternatively, they may be bonded to a backing such as a cemented carbide backing prior to being mounted on a tool or shank. Abrasive compacts bonded to a backing, typically a cemented carbide backing, are also known as "composite abrasive compacts".

Examples of abrasive compacts and composite abrasive compacts can be found in many patent specifications, e.g. British Patent Specification Nos. 1,489,130; 1,456,765 and 2048927 and U.S. Pat. specifications Nos. 3,745,623; 3,743,489 and 4,224,380.

SUMMARY OF THE INVENTION

According to the present invention, there is provided a method of bonding an abrasive compact to a metal-containing support body including the steps of interposing a layer of nickel, copper, cobalt, iron or alloy containing one or more of these metals between a surface of the compact and a surface of the support body and diffusion bonding the compact to the support body through the interposed layer at a temperature below the melting point of the layer.

DESCRIPTION OF THE DRAWINGS

FIG. 1 illustrates a sectional side view of an assembly for use in the method of the invention; and FIG. 2 illustrates a partially sectioned perspective view of the assembly of FIG. 1.

DETAILED DESCRIPTION OF THE INVENTION

The method of the invention uses diffusion bonding techniques. Diffusion bonding is known in the art and is a process which produces a metal-to-metal bond in which atoms of the metal migrate across the joint interface and form continuous grain. The process is a solid state process with the metal not reaching its melting point. Diffusion bonding has been found to produce bonds of excellent strength between the compact and support body under conditions where damage to the abrasive particle of the abrasive compact is substantially avoided. In other words, the compact is substantially free of graphite in the case of diamond compacts and substantially free of hexagonal boron nitride in the case of cubic boron nitride compacts.

Preferably, the method includes the following steps:
(a) bonding a layer of nickel, copper, cobalt, iron or an alloy containing one or more of these metals to a surface of the support body;
(b) bringing the compact and support body together so that the metal layer contacts a surface of the compact;
(c) urging the compact and support body together by applying a transverse pressure thereto;
(d) raising the temperature of the metal layer to a suitable temperature below its melting point; and
(e) maintaining the pressure and temperature for a time sufficient to cause diffusion bonding between the compact and the support body, steps (d) and (e) being carried out in an inert atmosphere.

During diffusion bonding of the backing to the substrate the pressure applied will generally be 40 to 300 N/mm$^2$ and the temperature applied will be typically of the order of 650° to 950° C. In the case of diamond compacts having a second phase containing a diamond catalyst the temperature will generally not exceed 750° C. The diffusion bonding will take place in a vacuum $10^{-4}$ Torr or better or other inert atmosphere such as an inert gas to minimise damage to the abrasive particles of the abrasive compact taking place. The pressure and temperature may be maintained for a period of 5 to 360, typically 5 to 35, minutes to ensure that a good bond is achieved.

The transverse pressure may be applied in the method of the invention by methods known in the art, for example, using a hydraulic cylinder press.

One particular method of applying the desired transverse pressure to the compact and support body utilises the difference in coefficient of thermal expansion between an outer surround body and an inner expansion body. The method involves placing the compact and support backing, after they have been brought together in step (c), in the cavity of an assembly comprising a surround body having a cavity formed therein and an expansion body located in the cavity and having a coefficient of thermal expansion greater than the surround body, and raising the temperature of the assembly to the desired temperature of step (d) thereby causing the expansion body to expand and apply the desired transverse pressure of step (c) to the compact and the support body.

Typically the temperature of the assembly is raised by placing it in a furnace.

The surround body may be made of cemented carbide or a ceramic based on silicon nitride or zirconia.

The expansion body is typically made of a metal or alloy which has a high coefficient of thermal expansion. An example of a suitable alloy is the nickel-based alloy Nimonic.

The surface of the cavity in contact with the expansion body may be sloping and match a sloping surface of the body. Alternatively, the expansion body may be in two contacting parts, the contacting surfaces being sloping and matching.

If the expansion body reacts detrimentally with the components being bonded under the applied temperature conditions, a suitable inert filler material may be provided between the expansion body and the components being bonded.

This method of applying pressure has particular application to the bonding of an abrasive compact to a tool shank, i.e. the tool shank is the support body.

The attached FIGS. 1 and 2 illustrate an embodiment of this aspect of the invention.

Referring to these Figures, there is shown an assembly 20 comprising a surround body 22 made of cemented carbide and having a slot or cavity 24 formed therein. The surround body 22 is mounted in recess 26 in a steel supporting base 28.

Located in the cavity 24 are opposing wedges 30, 32 which have contacting sloping surfaces along line 34. These wedges are made of the alloy Nimonic.

Also located in the cavity is a packing element 36 in contact with the surface 38 of wedge 32. Located between the packing element 36 and the surface 40 of the surround body is a tool shank 42 in bonding relationship with an abrasive compact 44. Located between the tool shank 42 and the compact 44 is a thin metal layer 46 suitable for creating a diffusion bond between the tool shank and the compact.

In order to achieve effective diffusion bonding between the tool shank and the compact the entire assembly is placed in a furnace at a suitable temperature. The temperature must be such as to allow diffusion bonding to take place. At this temperature the Nimonic wedges 30, 32 expand at a faster rate than the surround body 22. This has the effect of exerting a bonding pressure on the tool shank 42 and compact 44.

Polishing of the exposed surface of the metal layer is important and preferred to ensure that the surface is as flat as possible. Polishing may be achieved by use of a diamond polishing tool. The surface of the compact to which the support body is bonded should also be as flat as possible.

The metal layer bonded to the surface of the support body does tend to buckle and distort, particularly during polishing. To minimise this, it has been found preferably to deposit the layer on the surface, apply a transverse pressure to the layer, raise the temperature of the layer to a temperature below the melting point and maintain the pressure and temperature for a period sufficient to enable the layer to bond to the substrate. Typically, the pressure applied to the layer is in the range 1 to 200 $N/mm^2$ and the temperature to which the metal layer is raised is 700° C. to 1100° C. These conditions of temperature and pressure may be maintained for a period of 5 to 300 minutes, typically 5 to 30 minutes. The metal may be deposited on the surface of the substrate by methods known in the art such as electroplating, electroless plating, vapour deposition or sputtering or placing a foil of the metal in contact with the support body or placing the foil in contact with a metal coated surface of the support body. The transverse pressure may be applied by methods known in the art.

Prior to contacting the compact with the metal coated surface of the support body, the surface of the compact to be bonded may be provided with a thin metal coat of the same or similar metal to that which is used for coating a surface of the support body. Such layer may be deposited on the surface of the compact by methods known in the art such as electroplating, electroless plating, vacuum deposition and sputtering.

The abrasive compact may be any known in the art, as discussed in detail above. In particular, the abrasive compact may be a diamond or cubic boron nitride compact.

The support body may be a tool shank or be such that together with the abrasive compact it forms a composite abrasive compact.

The support body for the composite abrasive compact may be made of cemented carbide which is known in the art. Examples of suitable cemented carbides are cemented titanium carbide, cemented tantalum carbide, cemented tungsten carbide or mixtures thereof. The metal phase for the cemented carbide is generally nickel, cobalt, or iron which is present in an amount of 3 to 35 percent by weight.

The support body will generally be larger in mass and volume than the mass and volume of the abrasive compact.

The bonding layer between the compact and the support body will generally have a thickness of up to 220 microns. It has been found that by following the method of the invention bonds between compact and support body having shear strengths of at least 100 $N/mm^2$ can be achieved.

The invention is further illustrated by the following examples.

EXAMPLE 1

A stub of cobalt-bonded tungsten carbide had a disc of annealed nickel deposited on a surface thereof. A pressure of 40 $N/mm^2$ was applied to the nickel coated surface and the temperature raised to 900° C. These conditions were maintained for a period of 20 minutes. Thereafter, the exposed surface of the nickel layer was polished with a diamond polishing tool. The thickness of the nickel coat was 120 microns.

A disc-shaped cubic boron nitride compact having a second phase consisting essentially of aluminium nitride and/or diboride was then bonded to the stub by first contacting a major, flat surface of the compact with the nickel layer on the stub. A transverse pressure of 170 $N/mm^2$ was applied to the compact and the stub to urge the two together and the temperature of the interface, i.e. nickel layer, raised to 920° C. This treatment was carried out in a vacuum of $10^{-4}$ Torr. These conditions were maintained for a period of 200 minutes.

An excellent bond was achieved between the compact and the carbide stub by this diffusion bonding technique. The shear strength of the bond was measured and it was found to be of the order of 110 $N/mm^2$. The thickness of the bonding layer between the backing and the stub was of the order of 120 microns.

EXAMPLE 2

The procedure set out in Example 1 was followed save that in bonding the nickel coated stub to the compact the following conditions were used:
Pressure applied—170 $N/mm^2$
Temperature applied—950° C.
Conditions maintained—30 minutes.

Again an excellent bond between the compact and stub was achieved.

We claim:
1. A method of bonding an abrasive compact to a metal-containing support body including the steps of:
 (a) bonding a layer of nickel, copper, cobalt, iron or an alloy containing one or more of these metals to a surface of the support body;

(b) bringing the compact and support body together so that the metal layer contacts a surface of the compact;

(c) urging the compact and support body together by applying a transverse pressure thereto;

(d) raising the temperature of the metal layer to a temperature below its melting point and in the range of 650° C. to 950° C.; and (e) maintaining the pressure and temperature for a time sufficient to cause diffusion bonding between the compact and the support body, steps (d) and (e) being carried out in an inert atmosphere.

2. A method of claim 1 wherein the transverse pressure applied to the compact and support body is in the range 40 to 300 N/mm$^2$.

3. A method of claim 1 wherein the pressure and temperature are maintained for a period of 5 to 360 minutes.

4. A method of claim 3 wherein the pressure and temperature are maintained for a period of 5 to 35 minutes.

5. A method of claim 1 wherein the transverse pressure applied to the compact and support body is in the range 40 to 300 N/mm$^2$; the temperature to which the metal layer is raised is in the range 650° to 950° C. and the temperature and pressure conditions were maintained for a period of 5 to 360 minutes.

6. A method according to claim 1 wherein the compact and support body after having been brought together in step (b) are placed in the cavity of an assembly comprising a surround body having a cavity formed therein and an expansion body located in the cavity and having a coefficient of thermal expansion greater than that of the surround body, and the temperature of the assembly raised to the desired temperature of step (d) thereby causing the expansion body to expand and apply the desired transverse pressure of step (c) to the compact and support body.

7. A method according to claim 6 wherein the temperature of the assembly is raised by placing it in a furnace.

8. A method according to claim 6 wherein the surround body is made of cemented carbide or a ceramic based on silicon nitride or zirconia.

9. A method according to claim 6 wherein the expansion body is made of Nimonic.

10. A method according to claim 1 wherein the surface of the metal layer which is brought into contact with the surface of the compact is polished prior to step (b).

11. A method according to claim 1 wherein the metal layer is bonded to the surface of the support body by depositing the layer on the surface, applying a transverse pressure to the layer, raising the temperature of the layer to a temperature below its melting point and maintaining the pressure and temperature for a period sufficient to enable the layer to bond to the support body.

12. A method of claim 11 wherein the pressure applied to the metal layer is in the range 1 to 200 N/mm$^2$.

13. A method of claim 11 wherein the pressure and temperature applied to the metal layer are maintained for a period of 5 to 300 minutes.

14. A method of claim 11 wherein the pressure and temperature applied to the metal layer are maintained for a period of 5 to 30 minutes.

15. A method of claim 11 wherein the pressure applied to the metal layer is in the range 1 to 200 N/mm$^2$; and the temperature and pressure conditions are maintained for a period of 5 to 300 minutes.

16. A method according to claim 1 wherein the support body is a tool shank.

17. A method according to claim 1 wherein the abrasive compact bonded to the support body is a composite abrasive compact.

* * * * *